United States Patent [19]
Ko et al.

[11] Patent Number: 5,917,818
[45] Date of Patent: Jun. 29, 1999

[54] SYNCHRONOUS DIGITAL HIERARCHY DIGITAL CROSS-CONNECTION APPARATUS

[75] Inventors: Je Soo Ko; Sung Hyuk Choi; Ho Jae Lee; Jong Hyun Lee; Jae Guen Kim, all of Daejeon, Rep. of Korea

[73] Assignees: Electronics and Telecommunications Research Institute, Daeieon; Korea Telecommunication Authority, Seoul, both of Rep. of Korea

[21] Appl. No.: 08/761,499

[22] Filed: Dec. 6, 1996

[30] Foreign Application Priority Data

Dec. 21, 1995 [KR] Rep. of Korea ............. 95-53191

[51] Int. Cl.[6] ............................................. H04J 3/14
[52] U.S. Cl. ........................ 370/377; 370/535; 370/907
[58] Field of Search ........................... 370/369, 370, 370/360, 907, 372, 375, 377, 226, 535, 539, 503, 541

[56] References Cited

U.S. PATENT DOCUMENTS

| | | |
|---|---|---|
| 4,998,242 | 3/1991 | Upp . |
| 5,040,170 | 8/1991 | Upp et al. . |
| 5,515,362 | 5/1996 | Iwase .................................. 370/16 |
| 5,535,251 | 7/1996 | Sugawara ........................ 375/356 |
| 5,568,486 | 10/1996 | Huscroft et al. ................ 370/94.2 |
| 5,572,521 | 11/1996 | Pauwels et al. ................. 370/60 |
| 5,600,648 | 2/1997 | Furuta et al. .................. 370/248 |
| 5,712,862 | 1/1998 | Fujita et al. ................... 371/49.1 |

*Primary Examiner*—Chi H. Pham
*Assistant Examiner*—Kim T. Nguyen
*Attorney, Agent, or Firm*—Antonelli Terry, Stout & Kraus, LLP

[57] ABSTRACT

A synchronous digital hierarchy digital cross-connection apparatus. The apparatus includes a synchronous signal connecting unit having a STM-N signal receiving part, a reversely multiplexing part and a STM-N signal transmitting part; an AU frame phase arranging and signal supervising unit; and an AU switching unit. The AU frame phase arranging and signal supervising unit includes a downward signal inputting part, and AU frame aligner, a signal path supervisor, a downward signal outputting part, and upward signal inputting part, an unconnected signal supervising and generating part, a selector, an upward signal outputting part and a CPU interface.

3 Claims, 9 Drawing Sheets

SYNCHRONOUS DIGITAL HIERARCHY DIGITAL CROSS-CONNECTION APPARATUS

BACKGROUND OF THE INVENTION

1. Field of the Invention

The present invention relates to a synchronous digital hierarchy digital cross-connection apparatus (hereinafter, referred to as SDHDXC), which strengthens a signal supervision function.

The present application for the synchronous digital hierarchy digital cross-connection apparatus, is based on Korean Application which is incorporated herein by reference for all purposes.

2. Description of the Related Art

In general, the apparatus according to the present invention is connected to an optical cable to which an optical signal STM-N being a synchronous signal, described in ITU-T Recommendation G.707~G.709, is transmitted, and receives the cable signal STM-N to thereby perform data recovery and clock extraction through an optical to electrical conversion. Thereafter, the apparatus of the present invention processes section overhead SOH separately from payload after descrambling and reframing for the cable signal STM-N. Further, the apparatus in accordance with the present invention is intended to extract an AU signal from the separated STM-N payload and realign each frame phase by means of the same reference timing for executing a cross connect switching XCS operation by the AU. Then, the switched AU signal is multiplexed into the STM-N, together with the section overhead SOH, and converted into the optical signal to be transmitted to the optical cable. Furthermore, the apparatus of the present invention detects an unoccupied signal by supervising the AU signal input to the switch and releases a connection with the switch of a corresponding signal channel to thereby perform a signal end process. Moreover, the apparatus according to the present invention is intended to manage an unconnected signal state where the switching operation is released by supervising a signal to be output from the switch so that it is possible to switch a path of the synchronous signal and to smoothly perform a function of a digital cross connection.

In the present invention, a spare channel should always be surpervised and managed for protection so that a reconstruction and recovery operation can be performed when a transmission network railroad/path is disconnected in the synchronous transmission network to which the SDHDXC apparatus of the present invention is applied. Thereby, it should be necessary to thoroughly maintain the unconnected signal under supervision of a signal connecting state to be performed by the switched AU signal in front-end and post-end terminals of the cross connection switch.

SUMMARY OF THE INVENTION

It is therefore, an object of the invention to provide a synchronous digital hierarchy digital cross-connection apparatus which is capable of easily performing a wideband switching operation by the AU by aligning an AU frame between a synchronous signal connecting part and a wideband switch therein and by supervising a VC3 path, and of accomplishing a path supervision function and a digital cross connection function of the synchronous signal, respectively, by supervising and sensing a state of the unconnected signal of a VC3 signal.

To achieve the above object of the present invention, the apparatus of the present invention comprises a synchronous signal connecting unit having a STM-N signal receiving part for receiving an STM-N optical signal, performing an optical/electrical conversion, and accomplishing data recovery and clock extraction, a demultiplexing part for extracting and outputting N AUG (AU4) signals or 3×N AU3 signals through process of a section overhead within the STM-N signal, the demultiplexing part being connected to the signal receiving part, a multiplexing part for inputting a 8 bits parallel signal at a rate of 77.76 Mb/s, twelve serial signals at a rate of 51.84 Mb/s, or four 8 bits parallel signals at a rate of 19.44 Mb/s and multiplexing the signals as a STM-N signal form by inserting the section overhead, and a STM-N signal transmitting part for converting an electrical STM-N signal into an optical signal and transmitting the converted signal to an optical cable; an AU frame phase aligning and signal supervising unit for realigning frame phase for the AU signal or the AU4 signal and performing operations such as supervision of a VC3 path, a detection of an unconnected signal state, a generation of the unconnected signal state where a switching operation is released, and formation of the AU frame, the AU frame phase aligning and signal supervising unit being connected to the synchronous signal connecting unit; and an AU switching unit for executing a cross connect switching operation by the AU3 or the AU4, the AU switching unit being connected to the AU frame phase aligning and signal supervising unit.

BRIEF DESCRIPTION OF THE DRAWINGS

The above and other objects, advantages and features of the present invention will be more apparent from the following detailed description taken with the attached drawings in which.

DETAILED DESCRIPTION OF THE PREFERRED EMBODIMENT

In the following description, the specific details are set forth to provide a more thorough understanding of the present invention. It will be apparent, however, to one skilled in the art, that the present invention may be practiced without these specific details. In other instances, well known features have not been described in detail so as not to obscure the present invention.

Figure 1:
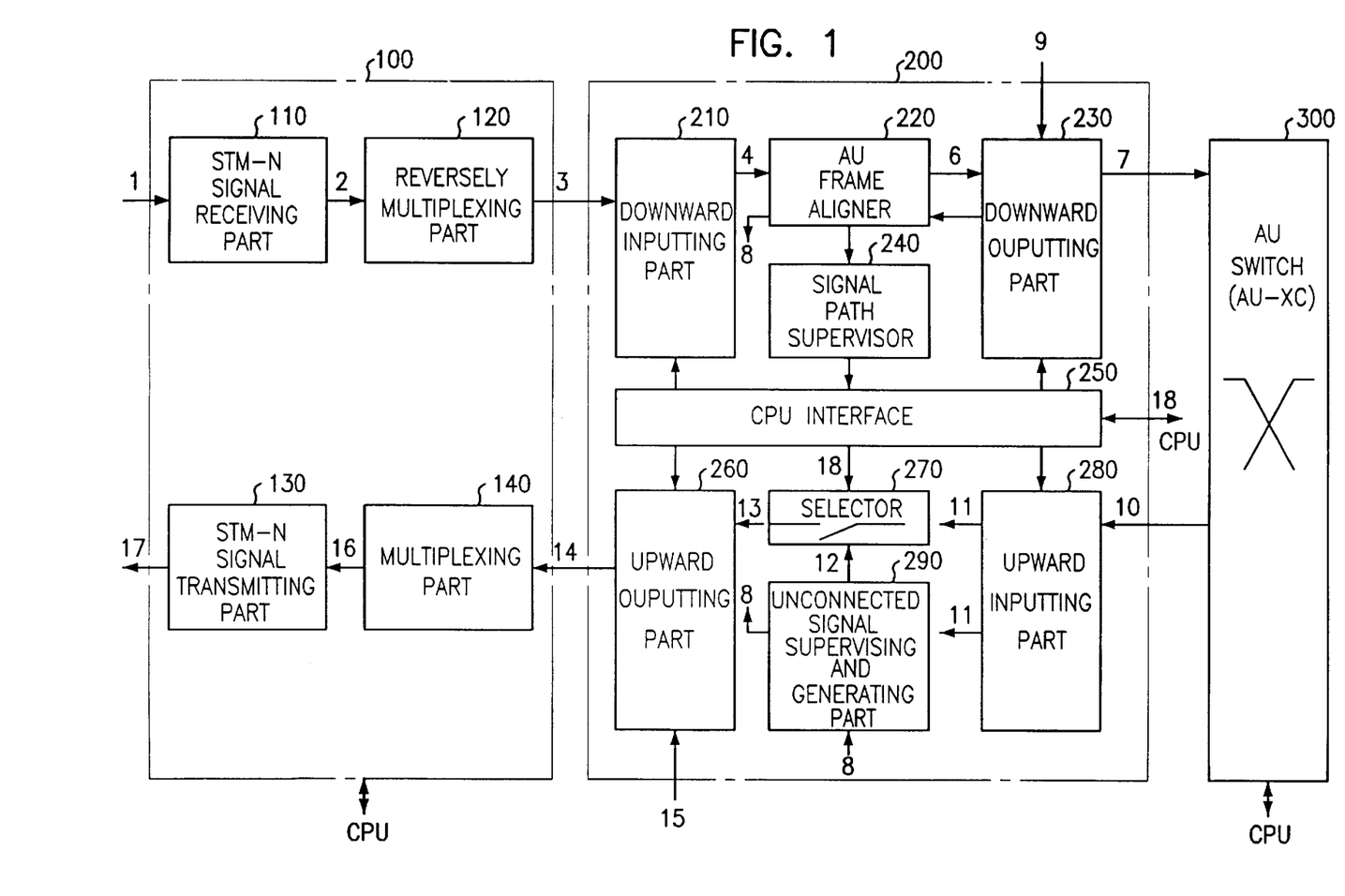
FIG. 1 is an overall configuration diagram of a synchronous digital hierarchy digital cross-connection apparatus.

FIG. 1 is a configuration diagram of a synchronous digital hierarchy digital cross-connection apparatus having an AU signal supervisor to process capacity of STM-4 (600M) grade, i.e., four AU4 signals or twelve AU3 signals.

Referring to FIG. 1, a downward input part 210 receives four AUG signals 3 from a synchronous signal connecting unit 100 and divides the four AUG signals into twelve AU3 signals to thereby transmit the signal to an AU frame aligner 220 and a signal path supervisor 240, respectively.

The AU frame aligner 220 separates AU pointer word from the received AU signal 4 and generates a frame offset to indicate the phase of a VC3 signal to thereby separate the VC3 signal from the frame offset. The separated VC3 signal is transmitted to the signal path supervisor 240. Further, the separated VC3 signal, together with the frame offset, is provided to a pointer buffer by a write clock. Data written into the buffer is read by a read clock from the downward output part 230. The read data is inserted in the AU pointer frame to be newly made by the read frame offset and is then output to the downward output part 230. The signal path supervisor 240 separately processes the VC3 path overhead POH and analyzes C2 byte to supervise the unconnected state. At this time, if the state of "0" is detected during five consecutive frames, the signal path supervisor 240 reports an UNEQ state 8 to a CPU interface 250. The downward output part 230 multiplexes an AU3 signal of which frame is re-aligned as the AUG signal by using an external timing clock 9, the AU3 signal being generated from the AU frame aligner 220. Then, the downward output part 230 converts the multiplexed signal at adequate signal speed 7 to be selected by a control signal 18 received from the CPU interface 250 to thereby output the signal to an AU switch 300. The upward input part 280 separates twelve AU3 signals 11 from the AUG signal received from the AU switch 300 and then transmits the separated signals to a selector 270 and an unconnected signal supervising and generating part 290.

The selector 270 determines through the control signal 18 of the CPU interface 250 whether it selects either an AU signal 11 to be input from the upward input part 280 or an AU signal 12 to be generated for itself from the unconnected signal generating part 290. Thereby, the signal 13 selected by the selector 270 is transmitted to an upward output part 260.

While the AU3 signal is supervised by the upward input part 280, the unconnected signal supervising and generating part 290 detects a state where there is no signal, i.e., a state where the switch is disconnected. Thereafter, the unconnected signal supervising and generating part 290 reports the detected state to the CPU interface 250. Further, the unconnected signal supervising and generating part 290 generates the AU signal 12 for itself and sends the generated signal to the selector 270.

The upward output part 260 multiplexes each AU3 signal 13 received from the selector 270 as an AUG form and converts the multiplexed signal into adequate signal speed 14 by means of the external clock timing 15 and the control signal 8 of the CPU interface 250 to thereby output it to a synchronous signal connecting unit 100.

Figure 2:
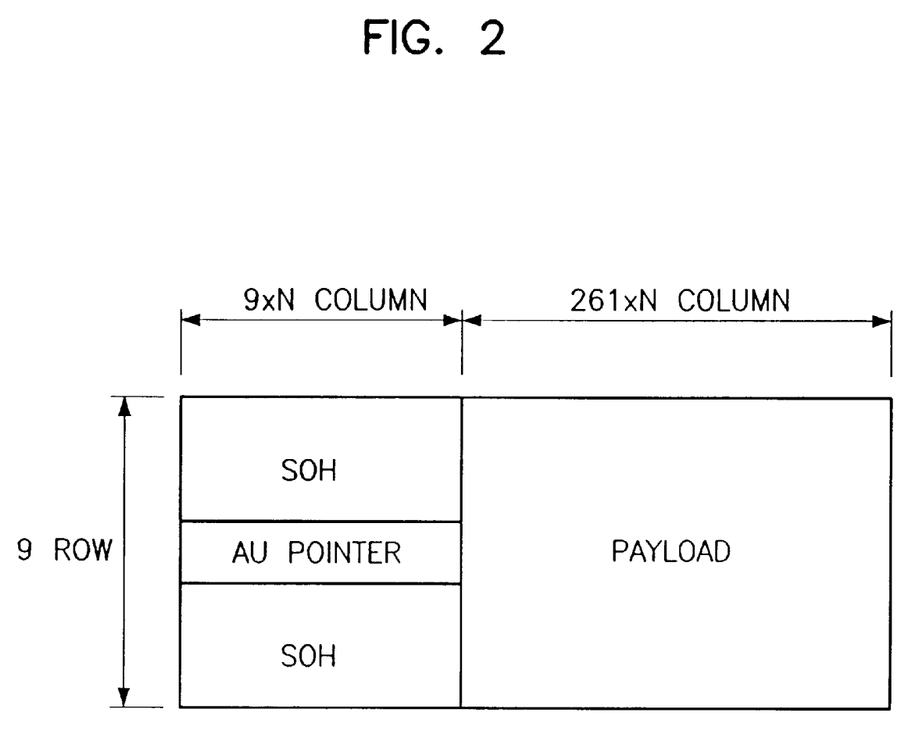
FIG. 2 is a configuration diagram of a STM-N signal frame.
Figure 3:
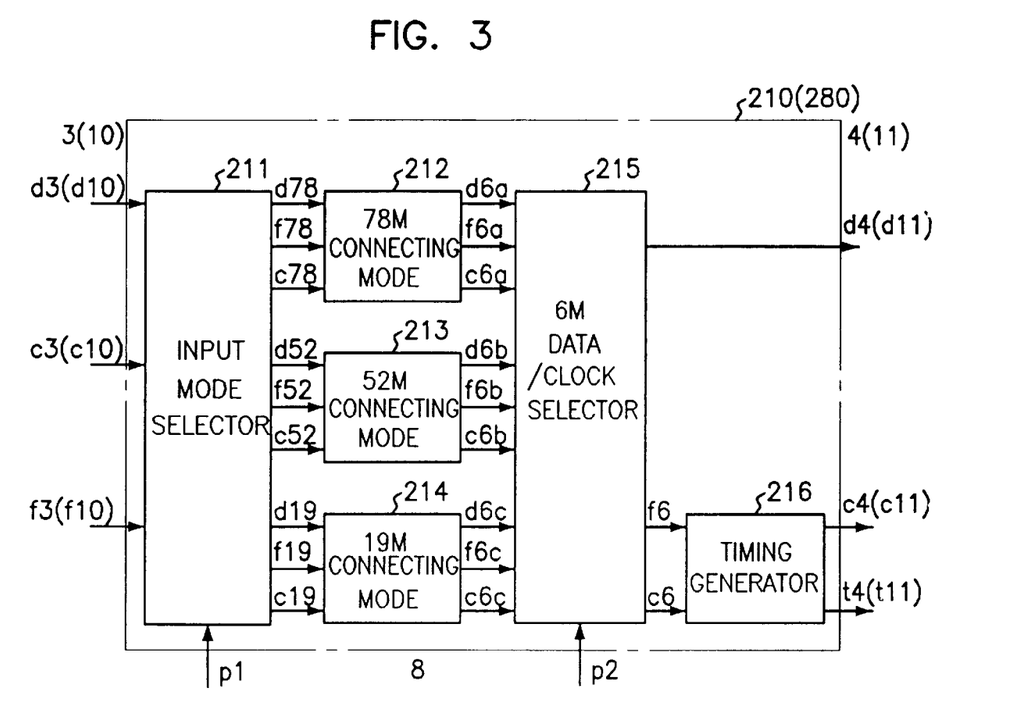
FIG. 3 is a block configuration diagram of a signal input connecting unit.
Figure 8A:
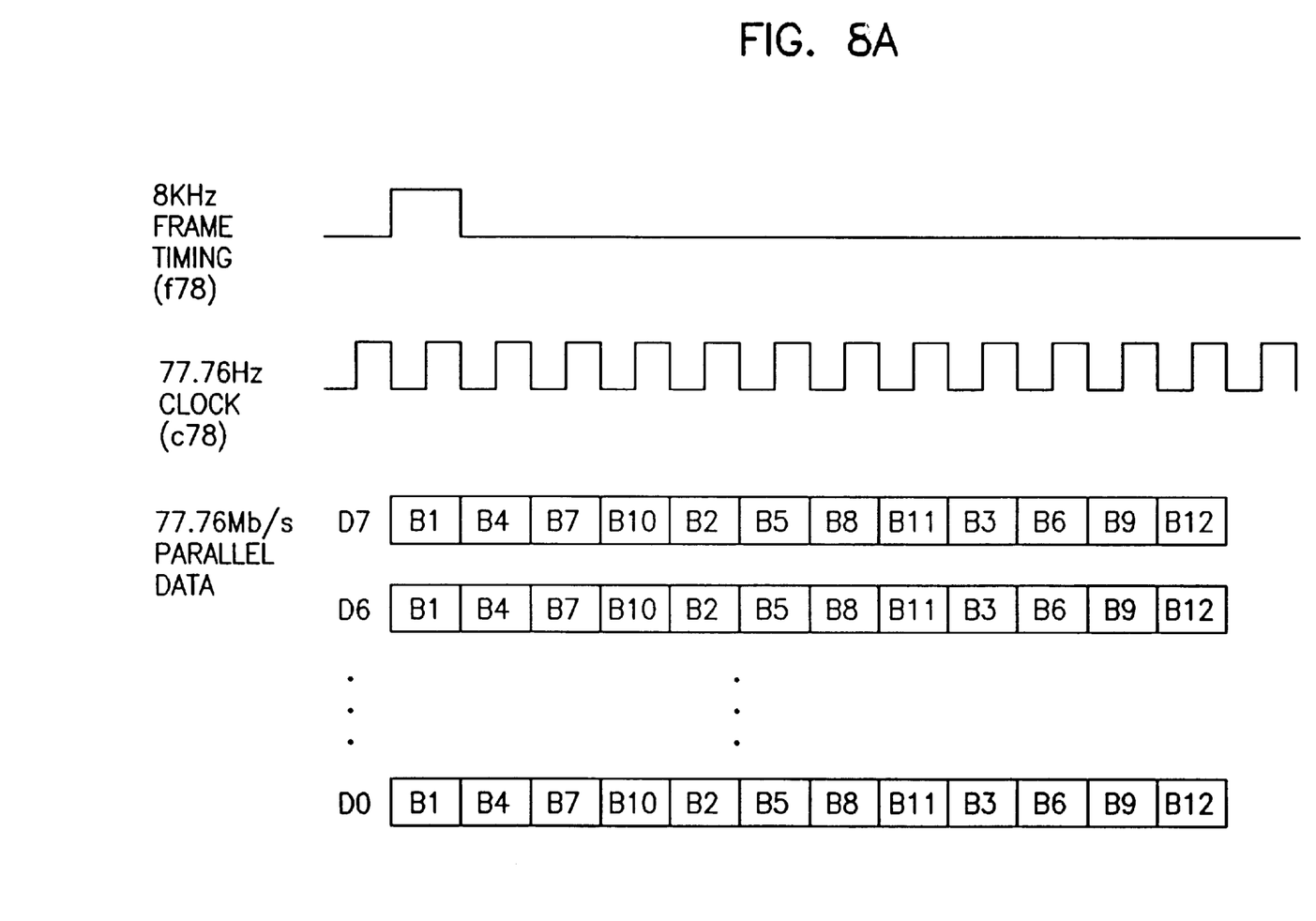
FIG. 8A is a timing diagram illustrating 77.76 Mb/s parallel mode.
Figure 8B:
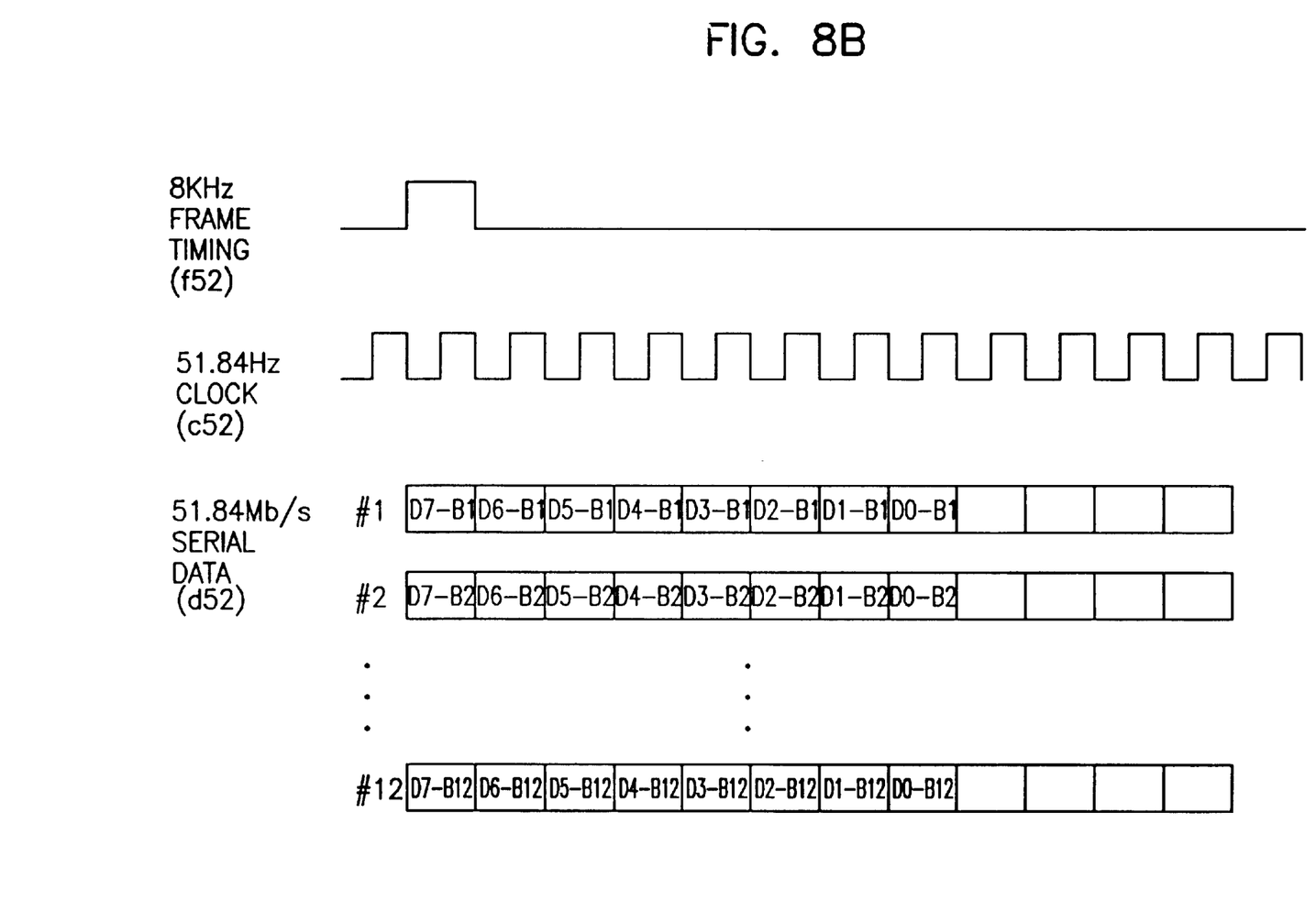
FIG. 8B is a timing diagram illustrating 51.84 Mb/s serial mode.
Figure 8C:
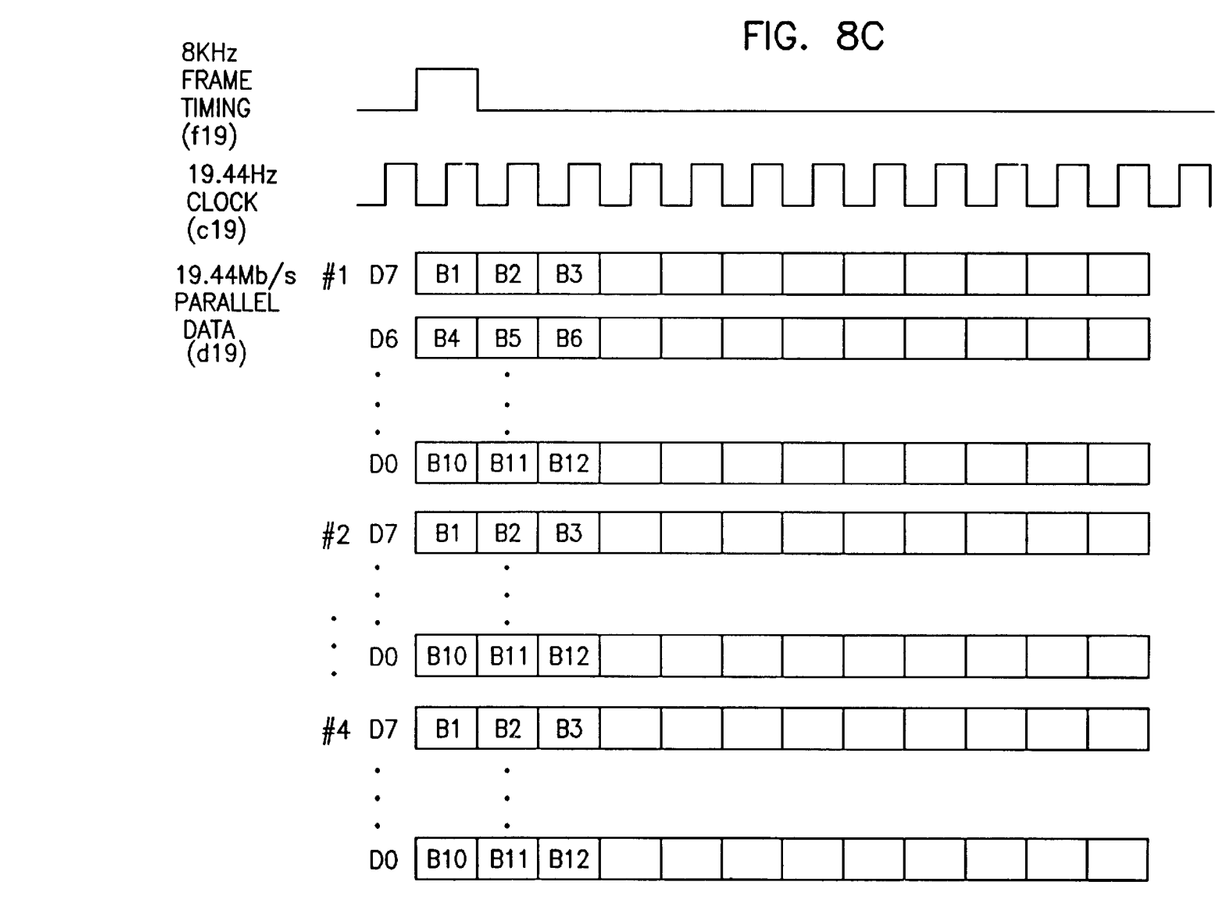
FIG. 8C is a timing diagram illustrating 19.44 Mb/s parallel mode.
Figure 8D:
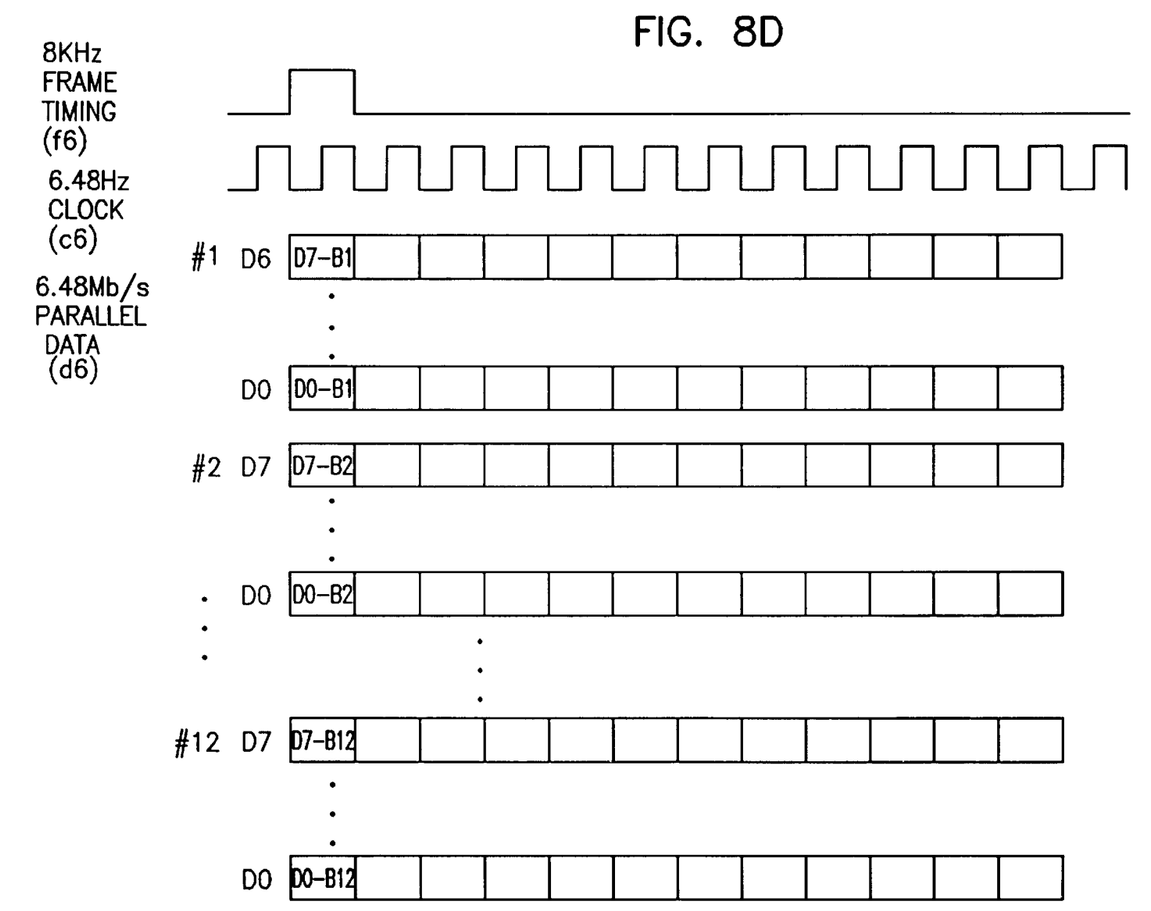
FIG. 8D is a timing diagram illustrating 6.48 Mb/s parallel mode.

FIG. 3 is a block configuration diagram of one of downward and upward signal input connecting units. There will be explained in FIG. 3 the downward signal input connecting unit 210. Referring to FIG. 3, input data d3, clock c3, and frame clock f3 are operated as three modes (referred to as FIGS. 8a to 8c) by a control signal p1 in an input mode selector 211. There are provided three modes such as a parallel signal connecting mode at a rate of 77.76 Mb/s (referred to as FIG. 8A), a serial signal connecting mode at a rate of 51.84 Mb/s (referred to as FIG. 8B), and a parallel signal connecting mode at a rate of 19.44 Mb/s (referred to as FIG. 8C). In case of 78M connecting mode, the data d3 is an 8 bits parallel signal according to a STM-4 signal form(referred to as FIG. 2), the clock is a data clock at a rate of 77.76 MHz, and the frame clock f3 is a reference timing clock at a rate of 8 KHz. In the meantime, the selected signals d78, f78, and c78 are demultiplexed in a 78M connecting part 212. Then, the selected signals are converted into twelve 8 bits AU3 parallel signals d6a at a rate of 6.48 Mb/s, AU3 parallel signal clock c6a at a speed of 6.48 MHz, and 8 KHz frame clock f6a having the pulse width of 6.48 Mb/s. In case of 52M connecting mode, the data d3 is input as twelve 51.84 Mb/s serial signals including one AU3 signal. The clock c3 is the data clock at a rate of 51.84 MHz and the frame clock f3 is the reference timing clock at a rate of 8 KHz. The selected signals d52, f52, and c52 are demultiplexed in a 52M connecting part 213. Then, the selected signals are converted into twelve 8 bits AU3 parallel signals d6b at a rate of 6.48 Mb/s, an AU3 parallel signal clock c6b at a rate of 6.48 MHz, and 8 KHz frame clock f6b having the pulse width of 6.48 Mb/s.

In case of 19M connecting mode, the data d3 is input as four 8 bits parallel signals at a rate of 19.44 Mb/s having one AUG signal. The clock c3 is the data clock of SMS 19.44 MHz and the frame f3 is the reference timing clock of 8 KHz. The selected signals d19, f19, and c19 are demultiplexed in a 19M connecting part 214. Then, the selected signals are converted into twelve 8 bits AU3 parallel signals d6c at a rate of 6.48 Mb/s, an AU3 parallel signal clock c6c at a rate of 6.48 MHz, and 8 KHz frame clock f6c having the pulse width of 6.48 Mb/s. Therefore, a 6M data/clock selector 215 selects each one of the three modes such as data d4, frame clock f6, and data clock c6 by the signals converted into the data of 6.48 Mb/s through a control signal p2. The selected frame clock f6 and the data clock c6 are provided to a timing generator 216 which generates a new clock c4 and timing t4.

Figure 4:
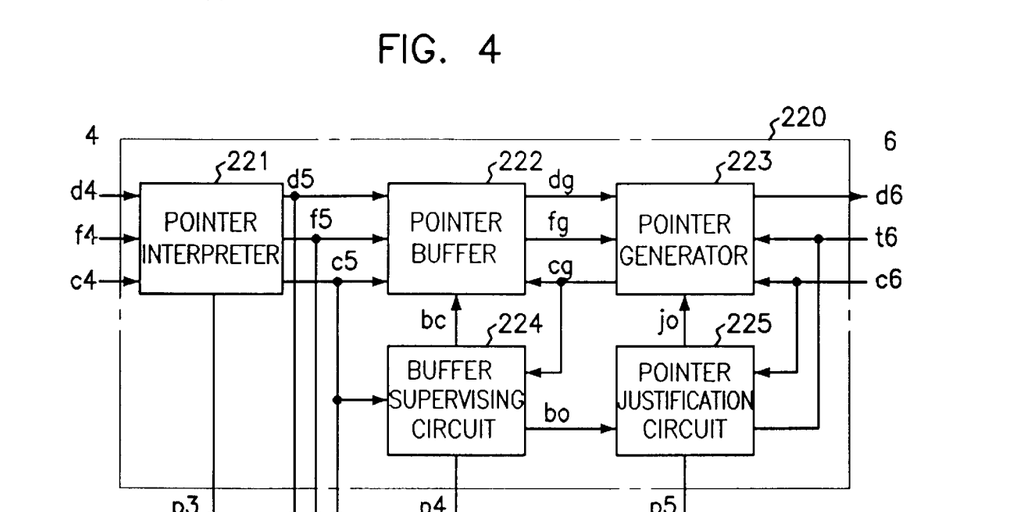
FIG. 4 is a block configuration diagram of an AU frame aligner.

FIG. 4 is a block configuration diagram of an AU frame aligner. Referring to FIG. 4, the input AU3 data d4, the frame clock f4, and the data clock c4 are all supplied to a pointer interpreter 221 that separates the AU pointer word from the AU3 data and then detects three states such as NORM, AIS, and LOP. Here, in case of the AIS state or the LOP state, the pointer interpreter 221 generates an interrupt signal p3 by alarm. In case of the NORM state, the pointer interpreter 221 analyzes a pointer value. If the value is of a normal range, the pointer analyzer 221 produces VC3 frame offset timing f5. The produced frame offset timing f5 and the separated VC3 data d5 are both used in a pointer buffer 222, together with the VC3 data clock c5. Meanwhile, if a pointer justification state PJ is added to the received pointer value, the pointer justification state PJ is applied to the offset timing f5 and the write clock C5 of the pointer buffer 222. In other words, if the state is of a positive pointer justification +PJ, the offset timing is pulled away by one gap. On the other hand, if the state is of a negative pointer justification –PJ, one clock is inserted and the offset timing is then advanced. The VC3 data dg and the frame offset fg output from the pointer buffer 222 are read by a read clock cg. When there is a difference between the read clock and the write clock, a buffer supervising circuit 224 accumulates the difference. Then, if the difference arrives at a threshold value of the pointer buffer, the buffer supervising circuit 224 adds the accumulated value bc to the pointer buffer 222 and a pointer justification circuit 225. At this time, the write clock c5 is compared with the read clock cg. As a result of the comparison, if the write clock is faster than the read clock, the pointer buffer comes to be full in its upper portion and is then moved in the direction of the positive threshold. To the contrary, if the write clock is slower than the read clock cg, the pointer buffer becomes empty in its lower portion and is then moved in the direction of the negative threshold. Further, if the buffer exceeds the threshold value and goes to be entirely full or empty thereby, the buffer fails to generate any data that is in an abnormal state. This is directly reported to the CPU by a signal P4. Moreover, the buffer is recovered to an initial state by performing a reset operation. The initial state means that a write address of the buffer is farthest away from a read address thereof.

The pointer justification circuit 225 receives the buffer threshold value arriving signal bo generated in the buffer supervising circuit 224 and generates a transmission pointer justification signal jo by the transmission data clock c6 and the timing T6 to thereby transmit the signal to the pointer generator 223 and report the state p5 to the CPU.

The pointer generator 223 generates the pointer value according to the frame offset fg through the pointer buffer and outputs the AU3 signal d6 with the VC3 data dg. Further, when there is the pointer justification signal jo based on the system clock c6 and the timing t6, the pointer generator 223 applies the pointer justification signal to the data clock cg, the transmission pointer, and the AU3 signal d6.

Figure 5:
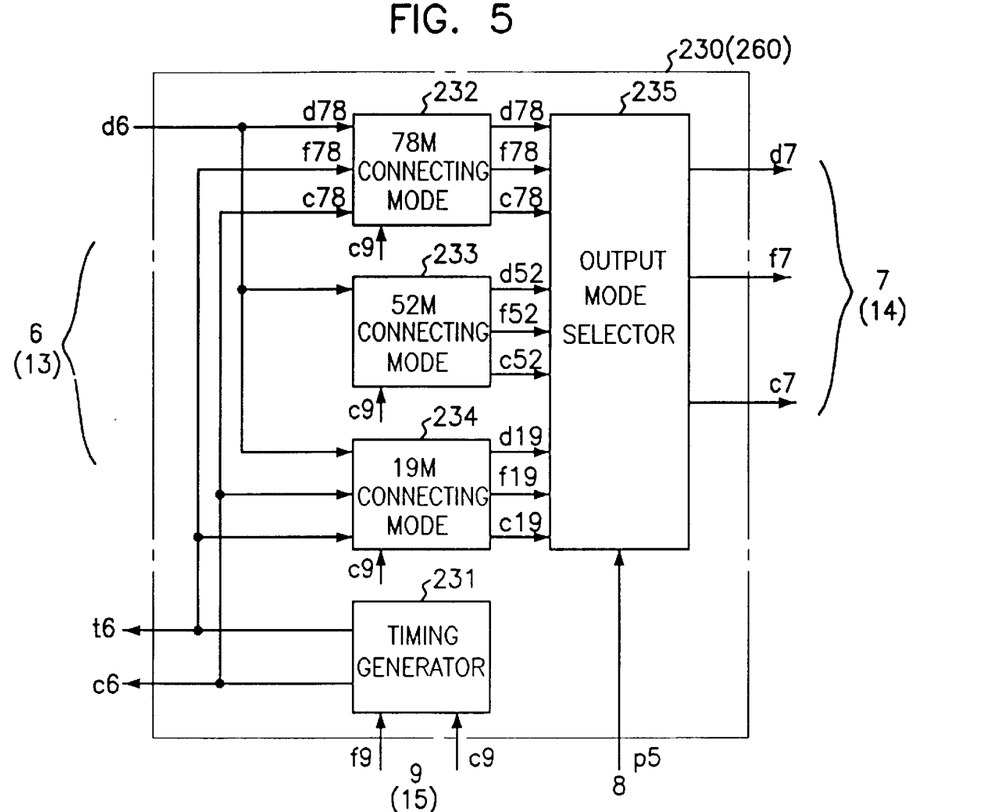
FIG. 5 is a block configuration diagram of a signal output connecting unit.

FIG. 5 is a block configuration diagram of a signal output connecting unit. There will be explained in FIG. 5 a downward signal. Referring to FIG. 5, a timing generator 231 receives from outside clocks which are different according to an operating mode and generates the same clock timing c6 and t6, regardless of the operating mode. A 78M convertor 232 multiplexes the twelve parallel AU3 data d6 at a rate of 6.48 Mb/s as a STM-4 frame form and converts the data into the parallel data d78 at a rate of 77.76 Mb/s. A 52M convertor 233 converts the twelve parallel AU3 data d6 at a rate of 6.48 Mb/s into twelve serial data d52 at a rate of 51.84 Mb/s, respectively. A 19M convertor 234 multiplexes three parallel AU3 data d6 at a rate of 6.48 Mb/s and produces the data as the AUG to thereby convert the data into the 19.44 Mb/s parallel data d19 of a STM-1 frame form. An output mode selector 235 selects one mode data of the converted data and output by means of the CPU and an external control signal p5 and then outputs the selected data d7, the frame clock f7, and the data clock c7.

Figure 6:
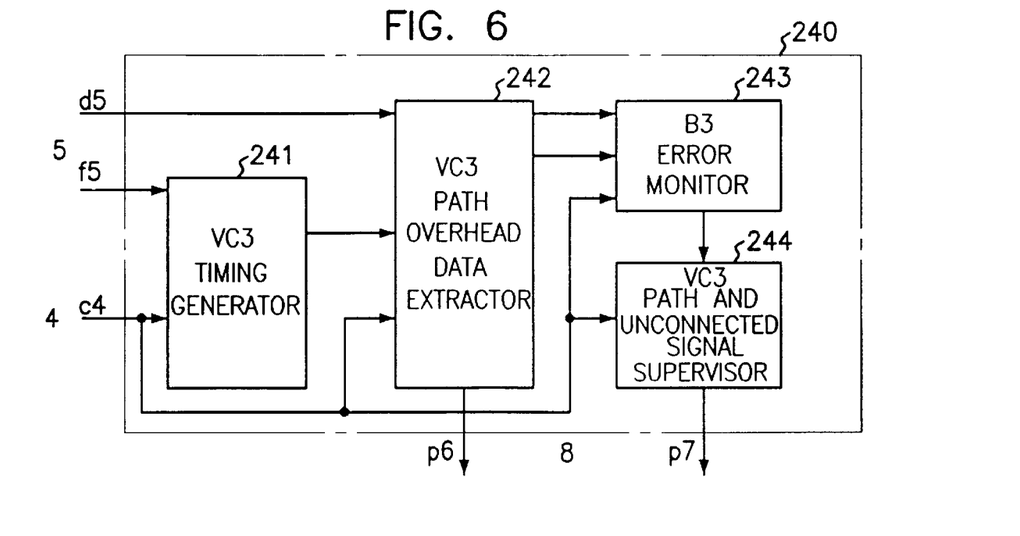
FIG. 6 is a block configuration diagram of a signal path supervisor.

FIG. 6 is a block configuration diagram of a signal path supervisor 240. There are provided in FIG. 6 a VC3 timing generator 241, a VC3 path overhead data extractor 242, a B3 error monitor 243, and a VC3 path and un-equipment signal supervisor 244. Referring to FIG. 6, the VC3 path supervision and un-equipment state is detected and then transmitted to the CPU.

Figure 7A:
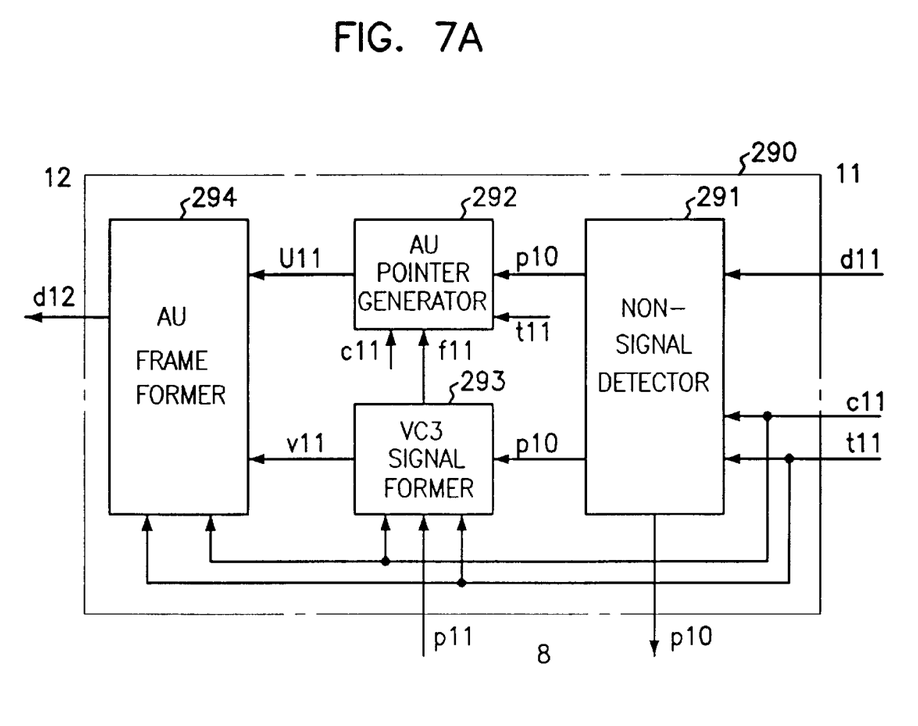
FIG. 7A is a block configuration diagram of an unconnected signal supervising and generating part.
Figure 7B:
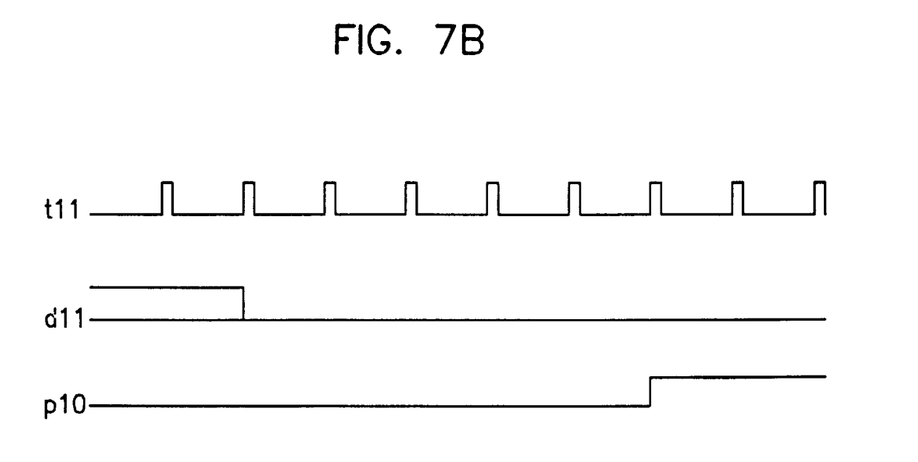
FIG. 7B is a timing diagram illustrating an unconnected signal supervising and generating state.

FIG. 7 is a block configuration diagram of an unconnected signal supervising and generating part 290. Referring to FIG. 7, a non-signal detector 291 supervises the twelve 6.48 Mb/s AU3 parallel data d11 received from an upward input part 280 by the signal. Thereafter, the non-signal detector 291 detects the unconnected signal state, i.e., one case that the state of "0" signal lasts during five frames in consecution. The one case means that there is no signal. Further, the non-signal detector 291 sends the detected signal to the AU pointer generator 292, a VC3 signal former, and the CPU interface as a signal p10. On the other hand, when the signal is sensed during the five consecutive frames, the non-signal detector 291 releases the state that there is no signal. Here, there may be generated the unconnected signal state by means of the control signal p11 of the CPU. The VC3 signal former 293 provides the state that there is no signal to C2 byte of the VC3 path overhead and produces a VC3 signal v11 to thereby send the produced signal to the AU frame former 294. At the time, any one frame offset indicating the location of the first byte of the used VC3 frame is transmitted to an AU pointer generator 292. The AU pointer generator 292 generates the AU pointer u11 by using the VC frame offset provided from the VC3 signal former 293 in the reference with the system timing t11, and then supplies the generated pointer to the AU from former 294. The AU frame former 294 multiplexes the AU pointer u11 and the vC3 signal v11 and makes the AU signal frame d12 to provide the formatted signal frame to the signal selector 270.

Therefore, as shown in FIG. 1, the AU switch 300 separates the AU signal from the signal 7 received from the AU supervisor 200 and performs the switching operation by the AU under control of the CPU. Thereafter, the AU switch 300 generates the same output signal 10 as the input one, and then outputs the value of "0" in case of a signal path where the switching connection is not performed. This enables the AU supervisor to speedily check the state that the switching connection is released.

As discussed in the foregoing description, the synchronous digital hierarchy digital cross-connection apparatus according to the present invention performs a plurality of functions such as rate conversion of the signal, the AU3 or AU4 pointer process operation, a supervising operation of the VC3 or VC4 path signal connecting state, and a generation of the unconnected signal by disposing the AU signal supervisor between the synchronous signal transmission part and the AU switch. Thereby, the present invention provides many advantages. First of all, the apparatus of the present invention can be applied to a variety of signal rates and forms (for example, a parallel signal at a rate of 77.76 Mb/s, a serial signal at a speed of 51.84 Mb/s, and a parallel signal at a speed of 19.44 Mb/s). Further, the apparatus according to the present invention is capable of performing the switching operation by the AU by realigning each of AU signal frames in the same system reference timing in its frame phase, the AU signal frames being included in the STM-N and also used for accommodating an asynchronized AU signal and absorbing a jitter/wonder through the AU pointer process to satisfy the ITU-T recommendation G.783. Furthermore, the apparatus according to the present invention can supervise/manage a signal path which is not connected with the switch and the signal path can be utilized as a spare channel thereby.

Therefore, it should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. The synchronous digital hierarchy digital cross-connection apparatus, comprising:
a synchronous signal connecting unit including:
an STM-N signal receiving part for receiving a STM-N optical signal, performing an optical/electrical conversion, and accomplishing data recovery and clock extraction,
a demultiplexing part for extracting and outputting N AUG(AU4) signals or 3×N AU3 signals through processing of a section overhead within said STM-N signal, said demultiplexing part being connected to said signal receiving part,
a multiplexing part for inputting an 8 bits parallel signal at a rate of 77.76 Mb/s, twelve serial signals at a rate of 51.84 Mb/s, or four 8 bits parallel signals at a speed of 19.44 Mb/s and multiplexing said signals as a STM-N signal form by inserting said section overhead, and
an STM-N signal transmitting part for converting an electrical STM-N signal into an optical signal and transmitting said converted signal to an optical cable;
an AU frame phase aligning and signal supervising unit for realigning frame phase for said AU signal or said AU4 signal and performing operations including supervising a VC3 path, detecting an unconnected signal state, generating said unconnected signal state where a switching operation is released, and forming said AU frame, said AU frame phase aligning and signal supervising unit being connected to said synchronous signal connecting unit; and an AU switching unit for executing a cross connect switching operation by the AU3 or the AU4, said AU switching unit being connected to said AU frame phase arranging and signal supervising unit, wherein said AU frame phase aligning and signal supervising unit comprises:

a downward signal inputting part for inputting said 77.76 Mb/s 8 bits parallel signal, twelve 51.84 Mb/s serial signals, or four 19.44 Mb/s 8 bits parallel signals multiplexed by one STM-4 signal and for demultiplexing and separating twelve AU3 signals into twelve parallel data of 6.48 Mb/s by a mode control signal;

an AU frame aligner for extracting an AU pointer from said 6.48 Mb/s AU signal separated from said downward signal inputting part and applying the same reference timing to all AU signals to thereby realign said frame;

a signal path supervisor for extracting a path overhead of a VC3 signal received from said downward signal inputting part and detecting said unconnected signal state by C2 byte;

a downward signal outputting part for receiving twelve AU data from said AU frame aligner and multiplexing said received signal into 77.76 Mb/s 8 bits parallel signal, twelve 51.84 Mb/s serial signals, or four 19.44 Mb/s 8 bits parallel signals to thereby output said multiplexed signal according to an external mode control signal;

an upward signal inputting part for inputting said 77.67 Mb/s 8 bits parallel signal, twelve 51.84 Mb/s serial signals, or four 19.44 Mb/s 8 bits parallel signals received from said AU switching unit in a reverse direction and demultiplexing said input signal into twelve 6.48 Mb/s parallel data;

an unconnected signal supervising and generating part for supervising a signal path from said AU switching unit and detecting a signal path from said AU switching unit and detecting and reporting a path of said unconnected signal to thereby form said AU frame;

a selector for selecting either AU data or an AU signal formed under control of said CPU, said AU data being generated from said upward signal inputting part and said unconnected signal supervising and generating part, and said AU signal being automatically generated from said unconnected signal supervising and generating part when said unconnected signal is detected;

an upward signal outputting part for receiving twelve AU data input from said selector and multiplexing said received signal into 77.76 Mb/s 8 bits parallel signal, twelve 51.84 Mb/s serial signals, or four 19.44 Mb/s 8 bits parallel signals to thereby output said multiplexed signal according to said external mode control signal; and a CPU interface for interfacing with an external CPU by being connected to said downward inputting/outputting parts, said signal path supervisor, said upward inputting/outputting parts, and said selector.

2. The synchronous digital hierarchy digital cross-connection apparatus as claimed in claim 1, wherein said unconnected signal supervising and generating part comprises:

a non-signal detector for detecting a state having no signal in the result of supervision of said AU3 signal to thereby make an unconnected state, and detecting another state having a signal to thereby make a connected state;

an AU pointer generator for receiving a corresponding VC3 frame offset from a VC3 signal former when a non-signal is detected from said non-signal detector and then generating an AU pointer;

a VC3 signal former for receiving said unconnected signal from said non-signal detector with respect to said corresponding signal path and then forming a VC3 signal to thereby transmit said unconnected signal to said C2 byte; and an AU frame former for forming an AU frame by multiplexing said VC3 signal input from said VC3 signal former and AU pointer word input from said AU pointer generator.

3. A synchronous digital hierarchy digital cross-connection, comprising:

a synchronous signal connecting unit including:

an STM-N signal receiving part for receiving a STM-N optical signal, performing an optical/electrical conversion, and accomplishing data recovery and clock extraction, a demultiplexing part for extracting and outputting N AUG(AU4) signals or 3×N AU3 signals through processing of a section overhead within said STM-N signal, said demultiplexing part being connected to said signal receiving part, a multiplexing part for inputting an 8 bits parallel signal at a rate of 77.76 Mb/s, twelve serial signals at a rate of 51.84 Mb/s, or four 8 bits parallel signals at a speed of 19.44 Mb/s and multiplexing said signals as a STM-N signal form by inserting said section overhead, and an STM-N signal transmitting part for converting an electrical STM-N signal into an optical signal and transmitting said converted signal to an optical cable;

an AU frame phase aligning and signal supervising unit for realigning frame phase for said AU signal or said AU4 signal and performing operations including supervising a VC3 path, detecting an unconnected signal state, generating said unconnected signal state where a switching operation is released, and forming said AU frame, said AU frame phase aligning and signal supervising unit being connected to said synchronous signal connecting unit; and an AU switching unit for executing a cross connect switching operation by the AU3 or the AU4, said AU switching unit being connected to said AU frame phase arranging and signal supervising unit, wherein said AU switching unit performs a switching operation by the AU under the control of said CPU by separating said AU signal from said input signals, transmits an output signal in the same manner as an input one, and transmits an output value of "0" with respect to a signal path where a switching connection is not performed.

* * * * *